(12) United States Patent
Chen

(10) Patent No.: US 7,136,115 B2
(45) Date of Patent: Nov. 14, 2006

(54) COMBINED AUDIO-VISUAL DEVICE FOR CARS

(76) Inventor: Gino Chen, No. 228, Sec. 3, Chung Ching N. Rd., Taipei (TW)

( * ) Notice: Subject to any disclaimer, the term of this patent is extended or adjusted under 35 U.S.C. 154(b) by 484 days.

(21) Appl. No.: 10/785,968

(22) Filed: Feb. 26, 2004

(65) Prior Publication Data

US 2005/0190308 A1 Sep. 1, 2005

(51) Int. Cl.
*H04N 5/64* (2006.01)
(52) U.S. Cl. .................... 348/837; 348/838
(58) Field of Classification Search ............ 348/837, 348/838, 739; 345/156, 38, 50, 87; 296/37.7; 386/126, 115, 22; 248/919; 361/679, 681, 361/682, 685, 686, 724–727; *H04N 5/64*
See application file for complete search history.

(56) References Cited

U.S. PATENT DOCUMENTS 6,292,236 B1 * 9/2001 Rosen ................. 348/837
6,339,455 B1 * 1/2002 Allan et al. ............. 348/837
6,409,242 B1 * 6/2002 Chang ................. 296/37.7
6,412,848 B1 * 7/2002 Ceccanese et al. ....... 348/837

* cited by examiner

*Primary Examiner*—Sherrie Hsia
(74) *Attorney, Agent, or Firm*—Lowe Hauptman & Berner, LLP

(57) ABSTRACT

A combined audio-visual device for cars includes a housing, a seat, a slot-type loading DVD player, a liquid crystal display (LCD) screen, two rotating hinges, a crosstalk interference suppression infrared emitter and wireless headphones. The slot-type loading DVD player reads audio and video data, respectively, and sends video output data to the LCD screen and the audio data to and through the crosstalk interference suppression infrared emitter; the video data is then be shown as image on the LCD screen and the audio data is transmitted as sound through the wireless headphones. The device according to the present invention is applicable to use on various cars to simultaneously satisfied demands of different users i.e., the audio-visual enjoyment for some passengers and at the same time, the quiet and peaceful for others.

5 Claims, 6 Drawing Sheets

COMBINED AUDIO-VISUAL DEVICE FOR CARS

FIELD OF THE INVENTION

The present invention relates to a combined audio-visual device for cars, and particularly for a combined audio-visual device that has a crosstalk suppression infrared emitter and a slot-type loading DVD player to be used in various cars.

BACKGROUND OF THE INVENTION

There are various ways to spend or kill time in a road trip such as readings. However, reading in cars would easily make reader uncomfortable after a short while so an alternative way to kill time on a road trip can be of audio video entertainment such as movie watching or video gaming. Furthermore, the development on the audio/video products is more matured and the growing fierce competition in the automotive market has prompted to put in audio/video systems in cars.

To satisfy passengers' enjoyment of audio listening and video watching, some businessmen put forward a combined audio-visual device with top-loading DVD player and liquid crystal display (LCD) screen for various cars, as disclosed in U.S. No. 2003/0128183 A1 patent. This combined audio-visual device is fixed to the car ceiling with a fixing plate. The fixing plate has a bottom portion with a recess for installing a top-loading DVD disc player. There is a screen installed on a movable plate, which is joined to the fixing plate with a rotational axis.

The top-loading DVD player has an open-able cover for putting in or taking out a DVD disc. On the cover there are a cuneiform body and its extender and there are a holding portion and a hole containing a sensor in it, so the top-loading DVD player can not operate normally unless the cover has been properly closed. The screen can be stored underneath the top-loading DVD player making the screen to be nearly flush with the housing.

The operation of the said top-loading DVD player clearly violates the law of gravity found by Isaac Newton in $17^{th}$ century. Without a supporting force, all things will follow the law of gravity to do free-falling motion. Similarly, a disc in the top-loading DVD player should fall down to the ground and cannot be operated normally as it must provide some kind of holding mechanism. The said device has disadvantages of complex structure and difficulty of use.

Moreover, the audio-visual device for cars nowadays provides audio and video enjoyment to passengers, but the more brought to the passengers the more complicated issues the passengers would need to deal with. Each passenger in a car might have a different preference. There are some passengers who want to watch video, some to listen to music, and some wish to stay quiet in a car. An audio-visual device, that can offer to satisfy these different needs for passengers, can greatly reduced inconveniences and potential arguments among the passengers, particularly kids.

In order to simultaneously satisfy passengers' different demands of watching video or listening music or staying quiet, the wired headphone for individual is brought forth to meet the needs. But the movable space of the wired headphone is limited by length; the users of wired earphone feel inconvenient and uncomfortable. To improve the situation, the present invention further provides the wireless headphone and a crosstalk suppression infrared emitter, which can suppress crosstalk when receiving/transmitting with multi-channel frequencies.

Therefore, an improved audio-visual device is needed. The present invention provides a combined audio-visual device that would simultaneously satisfy the different demands of the passengers.

SUMMARY OF THE INVENTION

The main object of the present invention is to provide a combined audio-visual device, which has a crosstalk suppression infrared emitter and a slot-type loading DVD player and can be used in various cars.

To accomplish the said object, the present invention includes a housing, a bottom seat, a slot-type loading DVD player, a LCD screen, two hinges, a crosstalk suppression infrared emitter and wireless headphones. The inner side of the housing has a connecting surface for connecting with a car. The outer side of the housing has a first holding space for holding the slot-type loading DVD player. The outer side of the first holding space is joined with a bottom seat. The outer side of the bottom seat has a secondary holding space for holding LCD device. The two ends of one side of the bottom seat are respectively provided with a connecting portion for connecting the two hinges. The LCD device is joined with the two hinges and can be turned in the secondary holding space. The crosstalk suppression infrared emitter is installed on the bottom seat at the other side of the connecting portion for receiving and transmitting the audio data from the slot-type loading DVD player, and the wireless headphones can receive and play the audio data.

To understand the present invention clearly, there is a preferred embodiment stated below:

DETAILED DESCRIPTION OF THE INVENTION

Figure 1:
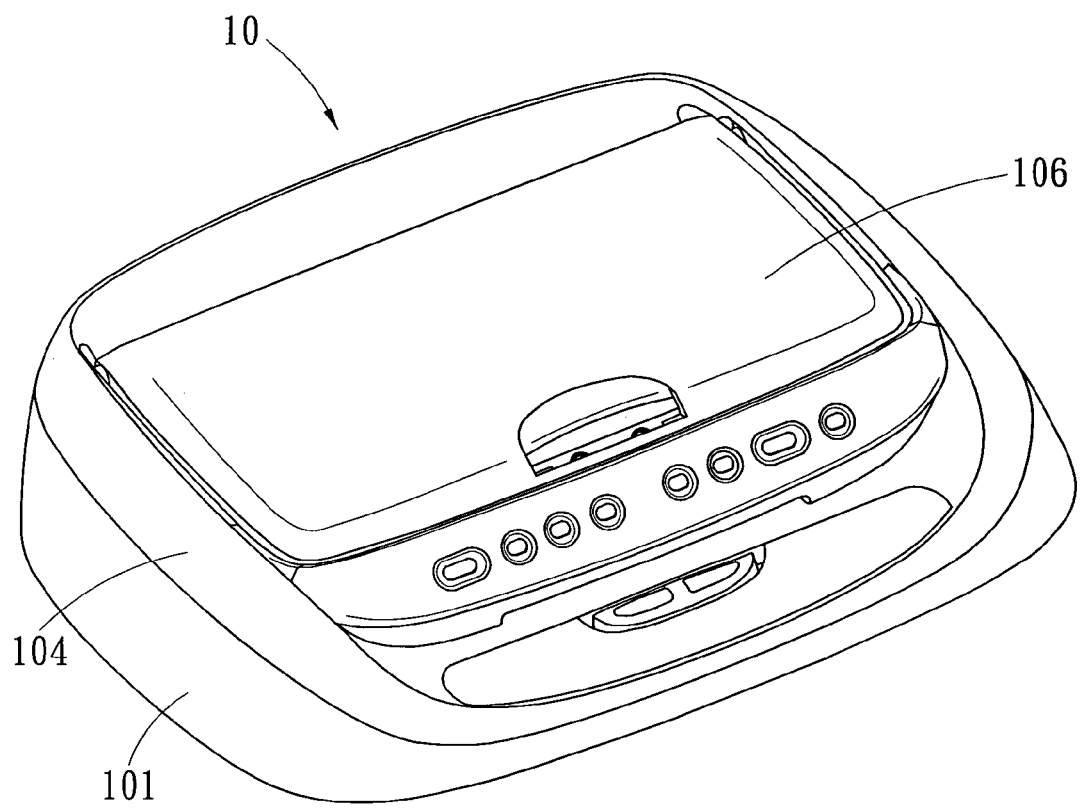
FIG. 1 is a perspective view of an embodiment in close situation according to the present invention.
Figure 2:
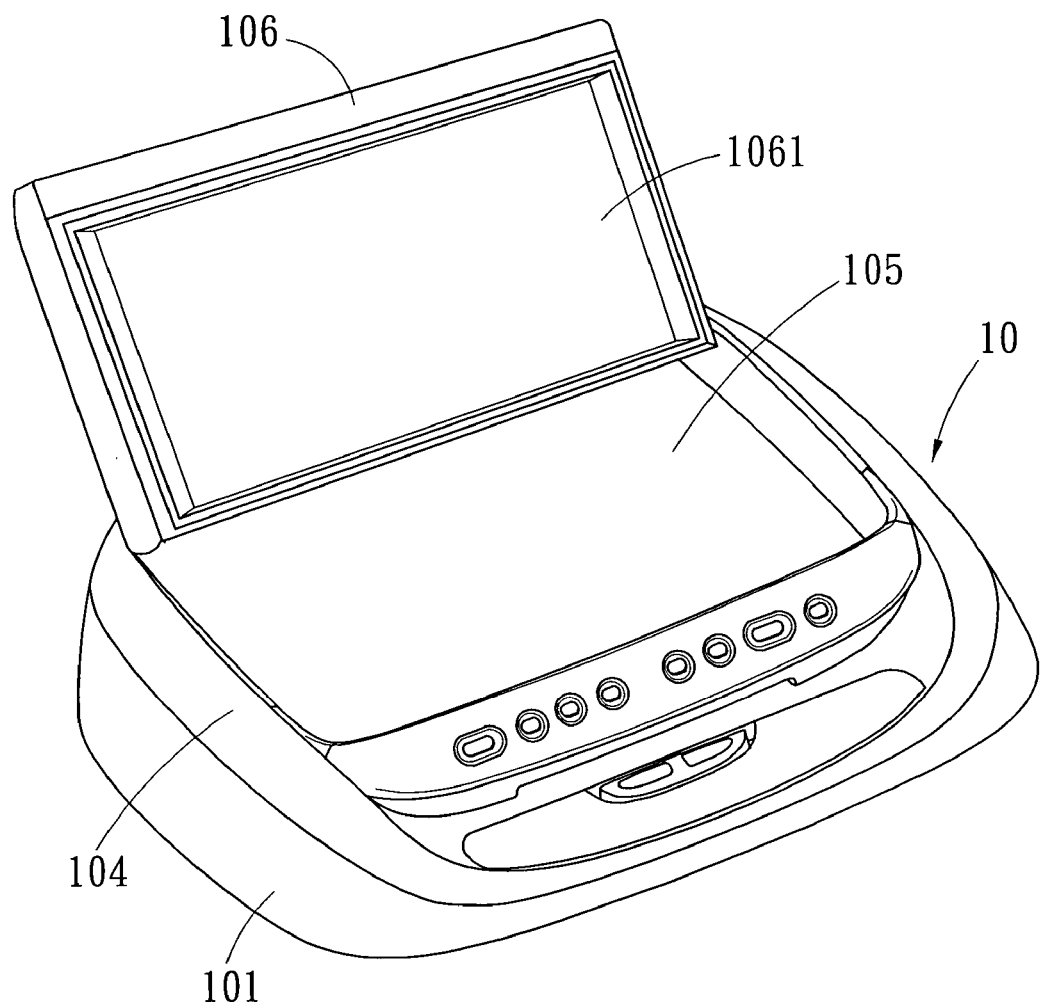
FIG. 2 is a perspective view of an embodiment in open situation according to the present invention.

As shown in FIG. 1 and 2, they are perspective views of an embodiment according to the present invention. FIG. 1 shows the close situation of LCD screen of the present invention. FIG. 2 shows the open situation of LCD screen of the present invention. The LCD screen faces downward when it is joined to the car ceiling. The component parts and their locations of an embodiment according to the present invention are shown in FIG. 3 and 4, respectively.

Figure 3:
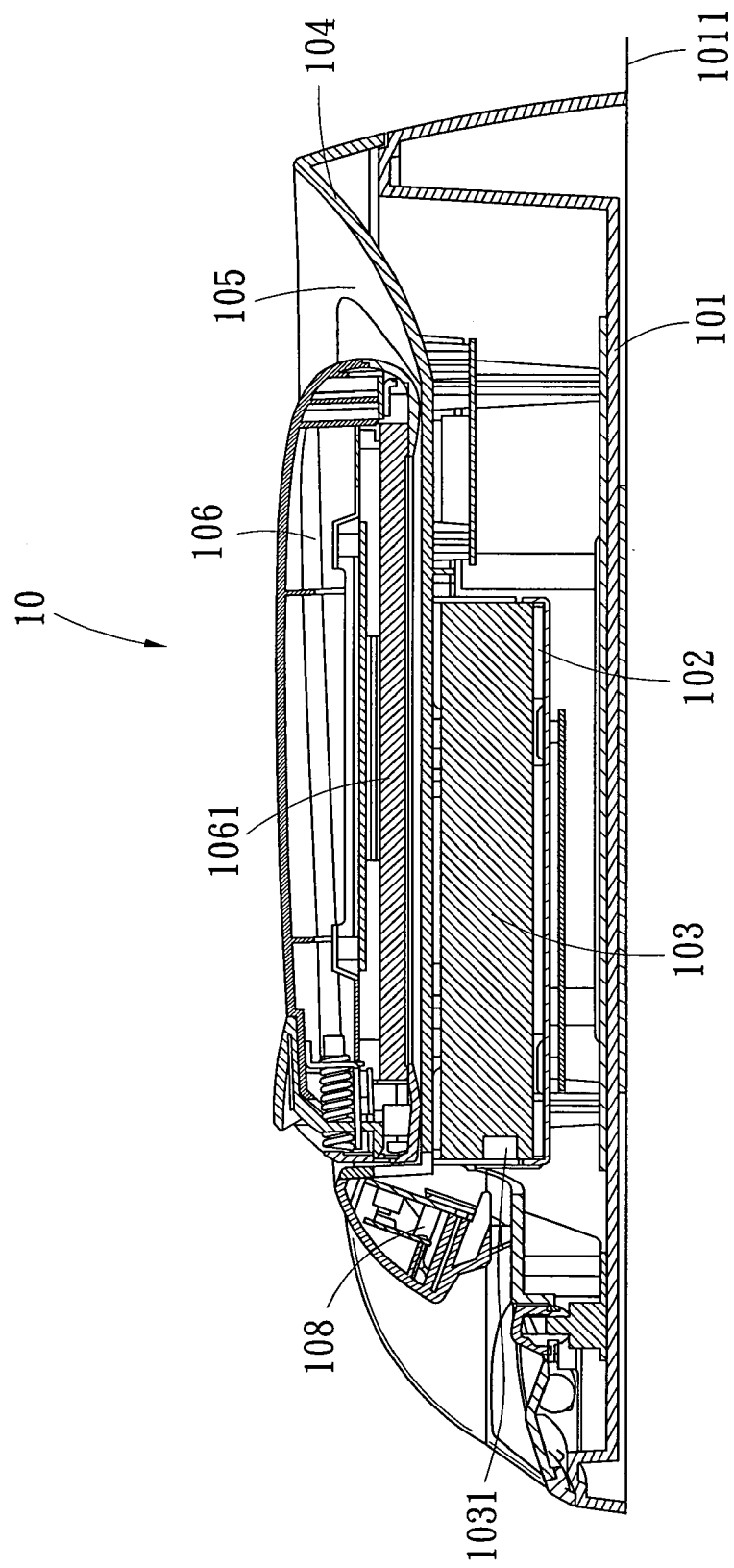
FIG. 3 is a cross sectional view of an embodiment in close situation according to the present invention.
Figure 4:
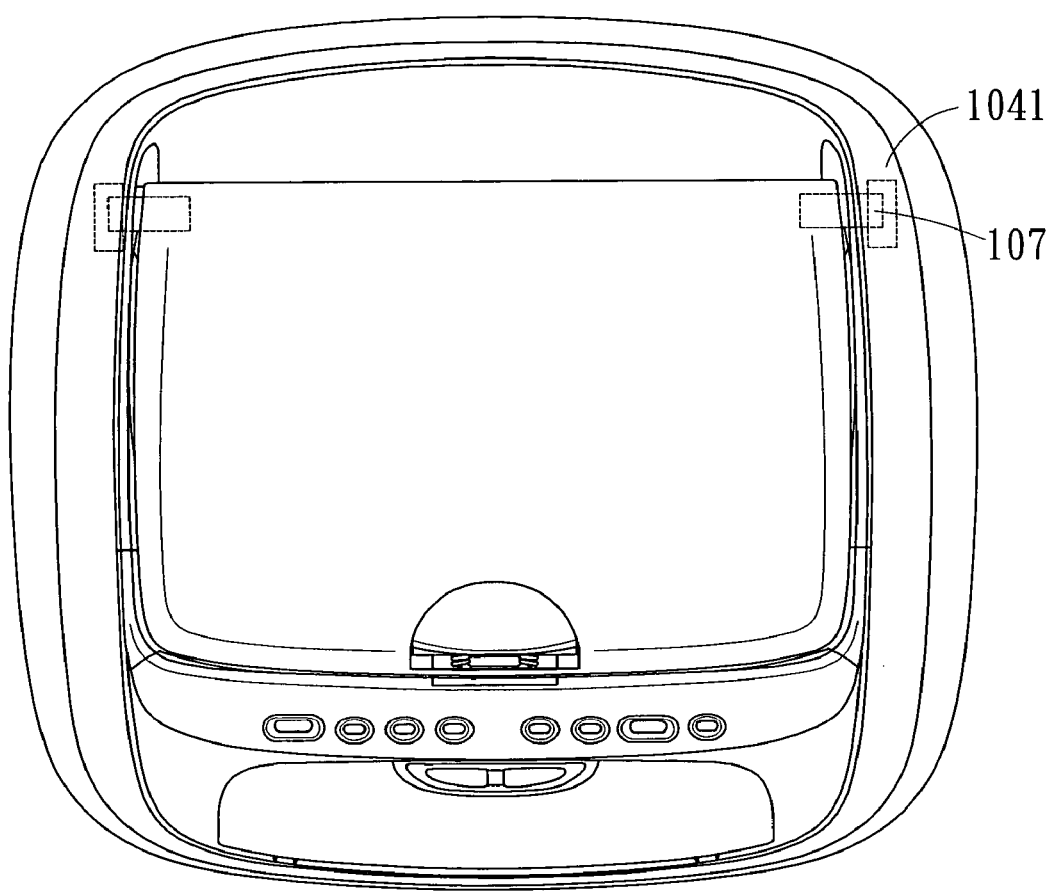
FIG. 4 is a top view of an embodiment according to the present invention.
Figure 5:
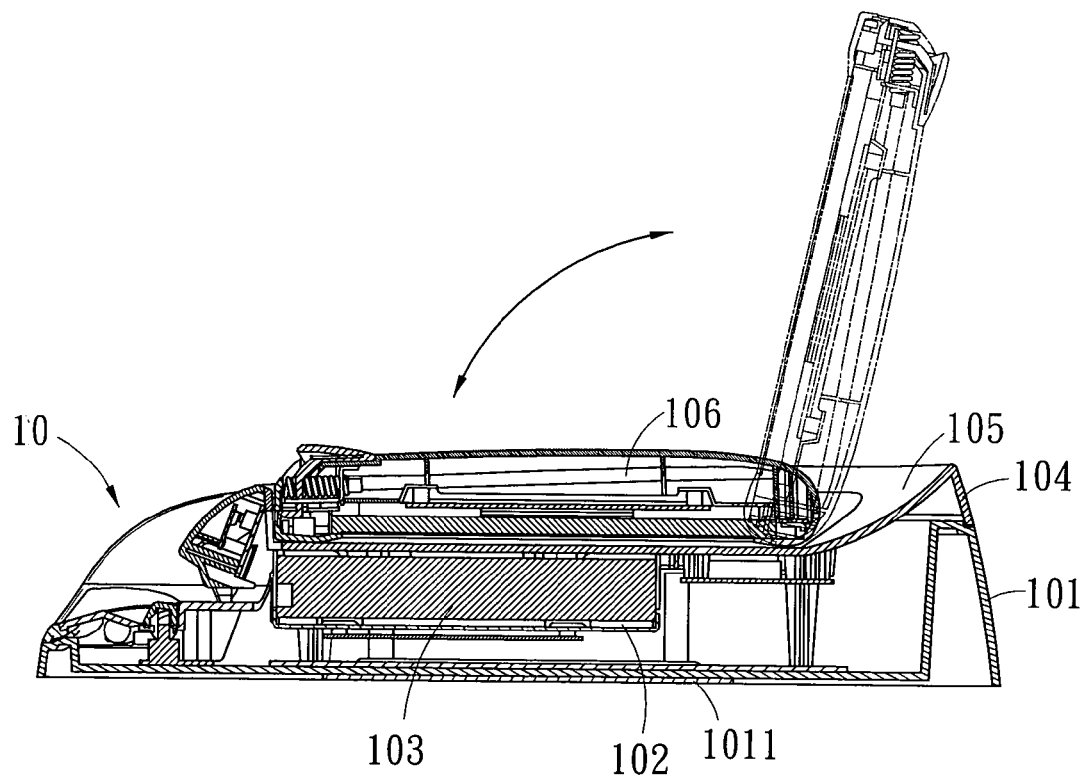
FIG. 5 is a cross sectional view of an embodiment in open situation according to the present invention.

In the FIG. 3 and 4, the inner side of the housing 101 has a connecting surface 1011 for connecting with a car. The outer side of the housing 101 has a first holding space 102 for holding slot-type loading DVD player 103 in which there is a disc slot 1031 on the side toward the passengers.

The outer side of the first holding space 102 is joined with a bottom seat 104 of which outer side has a secondary holding space 105 for holding liquid crystal display device. The two ends of one side of the bottom seat 104 are respectively installed with a connecting portion 1041. Additionally, there are two hinges 107 with L shape. One end of the hinges 107 is connected with the connecting portion 1041, and the other end is connected with the LCD device 106 in such a manner that the LCD device 106 can rotate around the hinges 107 and can be opened or closed under the secondary holding space 105. The LCD device 106 has one display side 1061. When the LCD device 106 is held in the secondary holding space 105, the LCD device 106 is parallel to the connecting side 1011. When the LCD device 106 is opened, the display side 1061 of the LCD device faces toward passengers. There is a crosstalk suppression infrared emitter 108 installed on the bottom seat 104 at the other side of the connection portion. It can transmit the audio data from the slot-type loading DVD player 103, and then the wireless headphone (not shown in FIG.) play the audio signal/data.

Figure 6:
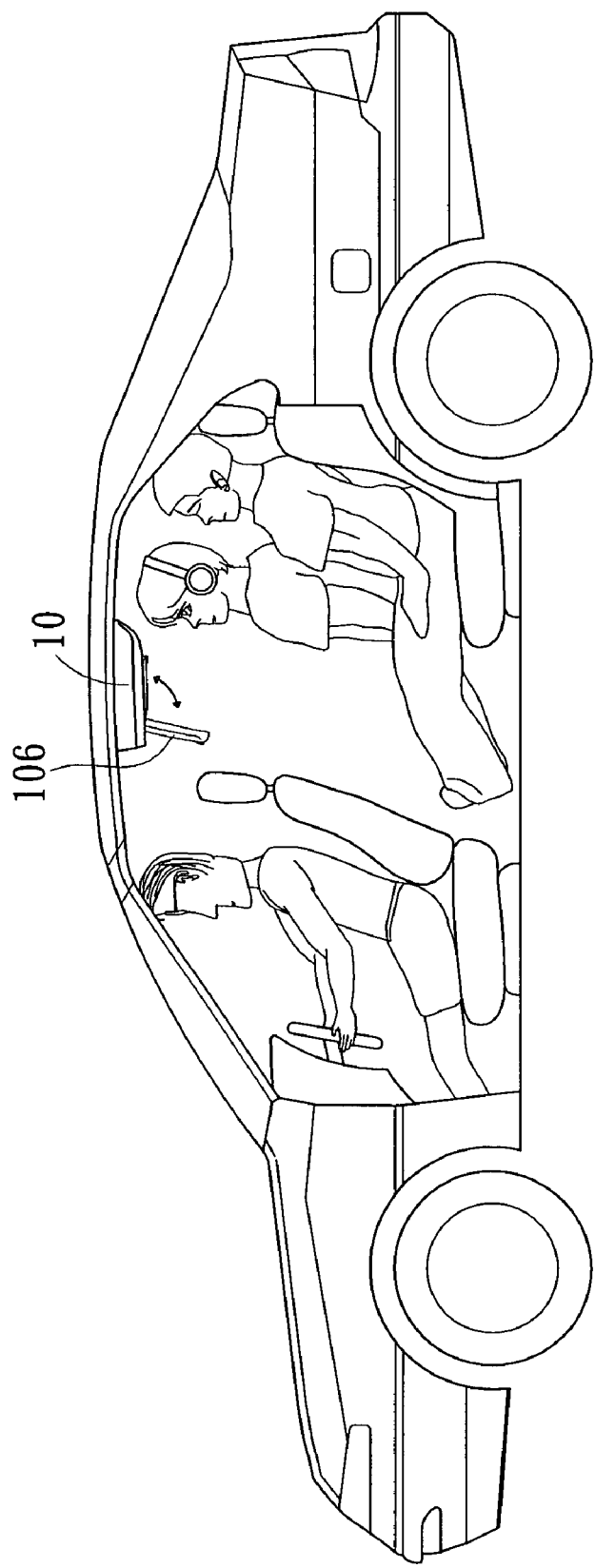
FIG. 6 is a diagram of an embodiment in use situation according to the present invention.

FIG. 6 is a diagram of an embodiment in use situation according to the present invention. The device is installed under a car ceiling and before the passengers on rear seats. If the passenger wants to watch the video, he can pull down the liquid crystal display screen 106 of the device 10 from the secondary holding space 105, let the display side 1061 of the LCD screen 106 faces toward himself and adjust the display side 1061 to a suitable angle for comfortable viewing.

The user with wireless headphone can insert the DVD disc into the slot 1031 of the DVD player 103 and operate the DVD player 103. The audio-visual data can be read by the DVD player 103, and then transmitted to the LCD screen 106 and wireless headphone respectively. The user can watch the video content on the display side 1061 and listen the audio content transmitted through the crosstalk suppression infrared emitter 108 and to the wireless headphone. Meanwhile, the other passengers can enjoy the silence and the driver can drive car with undivided attention.

Therefore, the present invention has the following advantages:
1. The structure of the device according to the present invention is compact, wherein the DVD player and LCD screen are piled up in such a manner that the space used in the car is saved and let the device can be hold more stable.
2. The operation of the present invention obeys the law of gravity, wherein the disc is sucked into the DVD player from the disc slot in such a manner that an additional holding part for resisting gravity is not needed.
3. The device according to the present invention is provided with a crosstalk suppression infrared emitter, which can suppress crosstalk when multi-channel frequencies are being transmitted so that it is able to bring user noise-free audio enjoyment.
4. The device of the present invention has infrared transmission function so that the passengers can have choices of watching video or staying quiet in the car. Most importantly, it does not disturb the driver.

As stated above, the present invention is indeed able to accomplish its objectives. The combined audio-visual device with a crosstalk suppression infrared transmission when transmitting multi-channel frequencies can be used on various cars to simultaneously satisfying different demands of passengers. The present invention has the utilization value in industry, so it is brought forward for claiming patent right.

What is claimed is:

1. A combined audio-visual device for cars including:
    a housing, its inner side having a connecting surface for connecting with a car, its outer side having a first holding space which is for holding a slot-type loading DVD player, the outer side of the first holding space being joined with a bottom seat of which outer side having a secondary holding space for holding a liquid crystal display (LCD) device, the two ends of one side of the bottom seat being provided with a connecting portion, respectively;
    two hinges, being connected with the connecting portions, the LCD device being connected with the two hinges and can be turned into the secondary holding space;
    a crosstalk suppression infrared emitter, it being installed on the bottom seat at the other side of the connection portion for receiving and transmitting the audio signal from the slot-type loading DVD player and then emitting the audio signal; and
    a wireless audio device for receiving and playing the audio signal from the crosstalk suppression infrared emitter.

2. The combined audio-visual device as claimed in claim 1, wherein the LCD device has one display side, when the LCD device is held in the secondary holding space, the LCD is parallel to the connecting side and when the LCD device is opened, the display side of the LCD device faces toward the passengers in the car.

3. The combined audio-visual device as claimed in claim 1, wherein the disc slot of the slot-type loading DVD player faces toward the passengers in the car.

4. The combined audio-visual device as claimed in claim 1, wherein the side on which the infrared emitter and the disc slot are installed draws back and forms a recess.

5. The combined audio-visual device as claimed in claim 1, wherein the wireless audio data device is a wireless headphone or a wireless loudspeaker.

\* \* \* \* \*